United States Patent [19]

Givens

[11] 4,409,480
[45] Oct. 11, 1983

[54] METHOD AND SYSTEM FOR THE TESTING AND CALIBRATION OF RADIOACTIVE WELL LOGGING TOOLS

[75] Inventor: Wyatt W. Givens, Dallas, Tex.

[73] Assignee: Mobil Oil Corporation, New York, N.Y.

[21] Appl. No.: 296,930

[22] Filed: Aug. 27, 1981

[51] Int. Cl.³ .................. G01D 18/00; G01V 5/00
[52] U.S. Cl. .................. 250/252.1; 250/256
[58] Field of Search .............. 250/252.1, 256, 267, 250/269

[56] References Cited

U.S. PATENT DOCUMENTS 4,085,323  4/1978  Turcotte et al. ............ 250/252.1
4,119,847 10/1979  Waggoner ................. 250/252.1

*Primary Examiner*—Janice A. Howell
*Attorney, Agent, or Firm*—Alexander J. McKillop; James F. Powers, Jr.; George W. Hager, Jr.

[57] ABSTRACT

An annular calibration unit employs a steady-state radioactive source. The calibration unit is slidably mounted about a radioactive logging tool and produces radioactive radiation for calibrating the radioactive radiation detectors within the logging tool.

4 Claims, 3 Drawing Figures

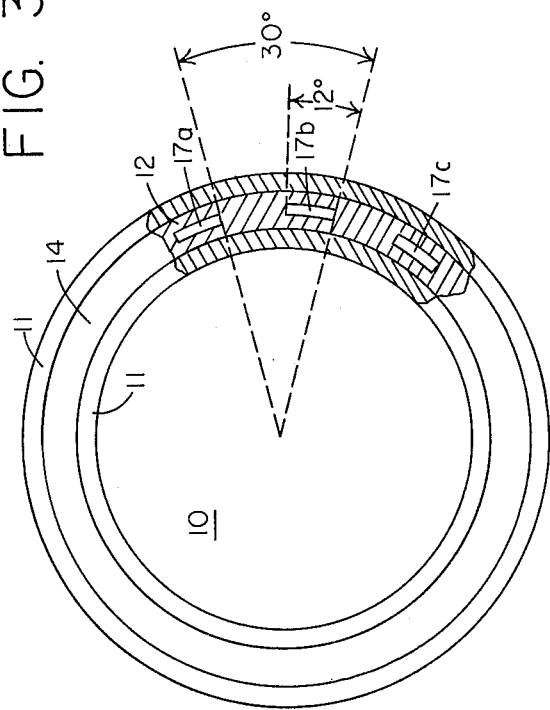
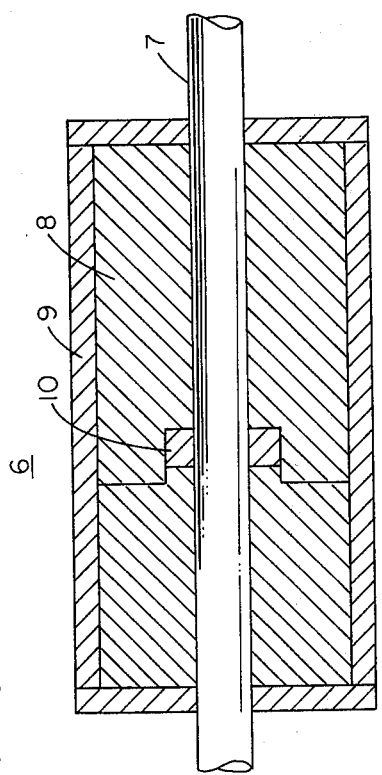
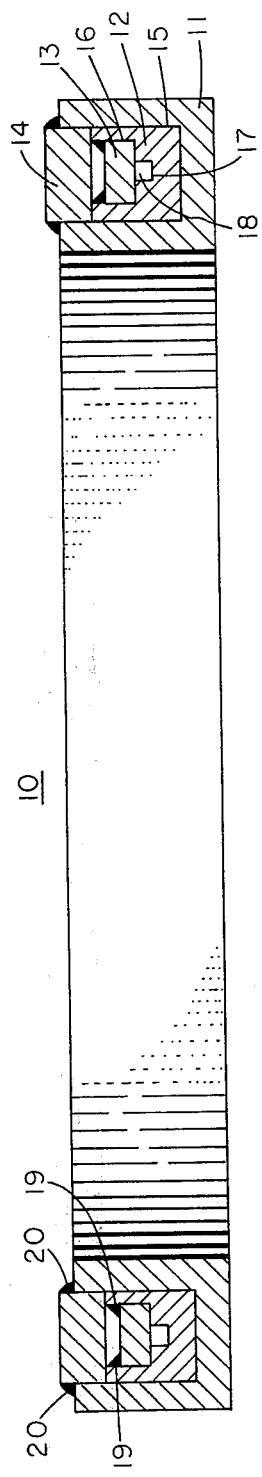

METHOD AND SYSTEM FOR THE TESTING AND CALIBRATION OF RADIOACTIVE WELL LOGGING TOOLS

BACKGROUND OF THE INVENTION

This invention relates to radioactive well logging and more particularly to an improved method and system for testing and calibration of a radioactive well logging tool.

Perhaps the most widely used of the radioactive logging procedures are the neutron logging techniques in which a formation under investigation is irradiated with neutrons and the resulting secondary radiation measured in order to characterize the formation. The neutron irradiation may be by means of a continuous source or a pulsed source, and the secondary radiation detected typically will take the form of thermal or epithermal neutrons or gamma-rays such as may result from inelastic scattering reactions or neutron capture. In pulsed neutron logging, the formation is bombarded with repetitive time-spaced bursts of fast neutrons, and the resulting secondary radiation is measured at selected time intervals, normally by gating the output of the detector, in order to arrive at a decay parameter.

In U.S. Pat. No. 4,180,729 to Givens, U.S. Pat. No. 4,180,730 to Givens and Mills and U.S. Pat. No. 4,209,694 to Mills, there is disclosed a borehole logging system which cyclically irradiates a formation of interest and suspected of containing uranium with bursts of fast neutrons. Both epithermal and thermal neutron fluxes resulting from the irradiation of the formation are measured. These neutron fluxes are measured during that time within each cycle of operation when prompt neutrons resulting from the thermal neutron fission of uranium 235 are expected. These measurements of epithermal and thermal neutron fluxes are compared as an indication of the uranium 235 concentration in the formation. This comparison is carried out by a determination of the ratio of the measured epithermal neutron flux to the measured thermal neutron flux. This ratio is proportional to the uranium 235 concentration, provided the epithermal and thermal neutron flux detectors have the same spacing with respect to the neutron source and further provided that the neutrons detected by these detectors are counted during the same time period. In this aspect, the epithermal and thermal neutron flux detectors are concentrically mounted with respect to each other about an axis parallel to the borehole wall so as to be equally sensitive to the epithermal and thermal neutron flux die-away measurements of the formations surrounding the borehole. The thermal neutron flux detector includes a plurality of detectors concentrically spaced about the epithermal neutron flux detector, each of such plurality of thermal nuetron flux detectors having their outputs joined together. Each of the plurality of thermal neutron flux detectors and the epithermal neutron flux detectors are of cylindrical form having axes parallel to the borehole wall.

BRIEF DESCRIPTION OF THE DRAWINGS

FIG. 1 is a cross-sectional view of the radioactive calibration unit of the present invention.

FIGS. 2 and 3 illustrate the annular neutron source of the calibration unit of FIG. 1.

SUMMARY OF THE INVENTION

The present invention relates to apparatus and a method for calibrating a radioactive logging tool and more particularly to an annular radioactive source adapted to slidable movement around the logging tool to a position whereby the radiation detector within the logging tool is exposed to irradiation from the surrounding annular radioactive source. The annular radioactive source may be in a continuous radioactive element or in the alternative, may be a plurality of spaced-apart radioactive elements.

In one embodiment, the radioactive source is a neutron source surrounded by a neutron moderating material such that the radiation detector within the logging tool is exposed to epithermal neutrons directly from the neutron source and thermal neutrons from the moderating material. The moderating material is surrounded by a neutron shield to prevent escape of thermal neutrons and to shield the neutron source, and hence the radiation detector from radioactive ground scattering effects.

In the calibration operation, the ratio of the count rate of epithermal and thermal neutrons measured by the epithermal and thermal neutron detectors is compared to the ratio determined from a previous calibration of the logging tool. Any change in such ratio indicates a change in the counting rate of either the epithermal or thermal neutron detector.

DESCRIPTION OF THE PREFERRED EMBODIMENT

Referring to FIG. 1 there is shown the calibration unit of the present invention which is useful in the testing or calibration of a radioactive well logging tool of the type disclosed in the aforementioned U.S. Pat. Nos. 4,180,729; 4,180,730 and 4,180,731. In FIG. 1 the calibration unit 10 is shown in the form of a cylindrical member having an inner diameter sufficient to permit its slidable mounting about a radioactive logging tool 11 to be tested and/or cablibrated.

The calibration unit 6 is slidably moved along the length of the logging tool 7 until it surrounds that portion of the logging tool housing the thermal and epithermal detectors as shown in the aforementioned U.S. patents. Such calibration unit includes an annular or circular-type steady-state neutron source 10 surrounded by a suitable neutron moderating material 8 such as polyethylene. Epithermal neutrons from the source are counted by the epithermal detector within the logging tool during calibration while thermal neutrons produced through the moderating effect of the polyethylene are counted by the thermal neutron detector within the logging tool during calibration.

Surrounding moderating material 8 is a neutron absorbing material 9 such as cadmium for shielding the neutron source 10 from ground scattering neutron effects and also to prevent the escape of moderated thermal neutrons.

In carrying out a calibration operation in accordance with the present invention, the radioactive logging tool 7 is preferably placed several feet above ground level so as to minimize any ground effects during such calibration. The calibration unit 6 is slidably moved along the tool until it surrounds the epithermal and thermal neutron detectors within the tool. The annular configuration of the neutron source 10 will provide annular distribution of neutron activity required for accurate calibration of such epithermal and thermal neutron detectors. The count rates of the detectors are measured and the ratio of such count rates monitored. Such ratio should remain constant for proper tool calibration. If the ratio has changed from the previous calibration run, then one of the detectors is producing too high a count rate or the other detector is producing too low a count rate.

Such a calibration operation is particularly useful for periodic field use during logging operations since the neutron source 10 is readily carried to the field site. The calibration chambers conventionally used for radioactive logging tool calibration in the laboratory are much too large and heavy for transporting to the field site.

Referring now to FIGS. 2 and 3, the details of the annular neutron source 10 will be set forth. Annular neutron source 10 is comprised of four annular members 11–14, as shown in FIG. 2, and preferably made of stainless steel. Annular member 11 includes the recessed slot 15 within which lies annular member 12 comprising the two recessed slots 16 and 17. Annular member 13 is sized to lie within recessed slot 16 completely enclosing the smaller recessed slot 17 to form an inner annular chamber 18. Enclosing annular members 12 and 13 within the recessed slot 15 is the annular member 14.

Referring to FIG. 3, the recessed slot 17 of annular member 12 may be either continuous or in a plurality of spaced slots, such as the slots 17a–17c for example. Within such slot or slots is deposited a steady-state neutron source such as alpha-beryllium or, even more preferably, Californium-252. The Californium-252 source has a lower energy, about 2.4 million electron volts, and when plated into 13 mil wire for forming a circular neutron source will produce aobut $2.3 \times 10^6$ neutrons/second/inch. In an embodiment employing a plurality of spaced slots for housing the plurality of neutron sources, such plurality of slots are located on spacings of about 30° and each slot subtends an arc of about 12°.

In the assembly of the annular neutron source 10, the annular member 13 is welded as shown at 19 in FIG. 2, within the recessed slot 16 of annular member 12 to provide an inner encapsulation unit for the CALIFORNIUM-252 source located within inner chamber 18. Likewise, the annular member 14 is welded, as shown at 20 in FIG. 2, within the recessed load 15 of annular member 11 to provide an outer encapsulation unit. Such double encapsulation feature ensures a safe containment for the radioactive CALIFORNIUM-252 source.

In the foregoing described preferred embodiment, the annular calibration unit employs a neutron source for the testing of epithermal and thermal neutron detectors of a radioactive logging tool. In an alternate embodiment, the annular calibration unit would contain a circular gamma radiation source such as cesium, with proper shielding material, for use in testing a radioactive logging tool having a gamma-ray detector. It is to be understood that such alternate embodiment, as well as other embodiments, may become apparent to one skilled in the art without departing from the scope and spirit of the invention as hereinafter defined by the appended claims.

I claim:

1. Apparatus for calibrating a radioactive logging tool having an epithermal neutron detector and a thermal neutron detector, comprising:
   (a) a steady-state neutron source,
   (b) means for housing said neutron source so as to permit said neutron source to be placed surrounding said radioactive logging tool,
   (c) means surrounding said housing for shielding said neutron source from radioactive ground scattering effects, and
   (d) neutron moderating means surrounding said neutron source and said radioactive logging tool, whereby the epithermal neutron detector of said radioactive logging tool is exposed to epithermal neutrons directly from said neutron source and the thermal neutron detector of said radioactive logging tool is exposed to thermal neutrons from said moderating material.

2. The apparatus of claim 1 wherein said moderating material is polyethylene.

3. The apparatus of claim 1 wherein said steady-state neutron source is Californium-252.

4. A method for calibrating a radioactive logging tool having an epithermal neutron detector and a thermal neutron detector, comprising the steps of:
   (a) surrounding that portion of said radioactive logging tool containing said epithermal and thermal neutron detectors with a steady-state neutron source, and
   (b) surrounding said neutron source and said radioactive logging tool with a neutron moderating material, whereby said epithermal neutron detector is irradiated with epithermal neutrons directly from said neutron source and said thermal neutron detector is irradiated with thermal neutrons from said moderating material,
   (c) determining the ratio of the count rate of epithermal and thermal neutrons measured by said epithermal and thermal detectors, and
   (d) comparing said ratio with a previously determined ratio for said logging tool, any change in said ratio from a previous calibration operation indicating a change in the counting rate of one of said epithermal or thermal neutron detectors.

* * * * *